US008670931B2

(12) United States Patent
Mays

(10) Patent No.: US 8,670,931 B2
(45) Date of Patent: Mar. 11, 2014

(54) METHODS AND SYSTEMS FOR VISUAL ADDRESSING

(76) Inventor: Michael F. Mays, Mount Solon, VA (US)

( * ) Notice: Subject to any disclaimer, the term of this patent is extended or adjusted under 35 U.S.C. 154(b) by 1689 days.

(21) Appl. No.: 10/390,838

(22) Filed: Mar. 18, 2003

(65) Prior Publication Data

US 2003/0208315 A1 Nov. 6, 2003

Related U.S. Application Data

(63) Continuation-in-part of application No. PCT/US01/27735, filed on Sep. 27, 2001, which is a continuation of application No. 09/671,271, filed on Sep. 28, 2000, now Pat. No. 6,351,710.

(51) Int. Cl.
    *G01C 21/26* (2006.01)
(52) U.S. Cl.
    USPC ........................................... 701/428; 701/431
(58) Field of Classification Search
    USPC ......... 701/200, 201, 206, 202, 211, 208, 213, 701/428, 431, 436, 440, 441; 340/995; 342/357.13; 345/8; 434/38; 348/222.1, 348/231.3; 358/1.18; 382/278
    IPC ....................................................... G01C 21/26
    See application file for complete search history.

(56) References Cited

U.S. PATENT DOCUMENTS

| 4,630,065 A | 12/1986 | Ichikawa |
| 4,843,463 A | 6/1989 | Michetti |
| 4,937,752 A | 6/1990 | Nanba |
| 5,113,185 A | 5/1992 | Ichikawa |
| 5,115,398 A | 5/1992 | De Jong |
| 5,396,431 A | 3/1995 | Shimizu |
| 5,452,217 A * | 9/1995 | Kishi et al. ..................... 701/207 |
| 5,511,195 A | 4/1996 | Kennedy |
| 5,774,071 A | 6/1998 | Konishi |
| 5,850,193 A | 12/1998 | Shimoura |
| 5,870,741 A * | 2/1999 | Kawabe et al. ..................... 707/5 |
| 5,899,575 A * | 5/1999 | Okayama et al. ............... 386/46 |
| 5,899,956 A | 5/1999 | Chan |
| 5,907,416 A * | 5/1999 | Hegg et al. ....................... 359/14 |
| 5,931,888 A * | 8/1999 | Hiyokawa ..................... 701/208 |
| 5,944,768 A | 8/1999 | Ito |
| 5,973,692 A * | 10/1999 | Knowlton et al. ............ 715/835 |
| 6,018,697 A | 1/2000 | Morimoto |
| 6,035,253 A | 3/2000 | Hayashi |
| 6,067,502 A | 5/2000 | Hayashida |

(Continued)

FOREIGN PATENT DOCUMENTS

| JP | 10174110 A | * | 6/1998 |
| JP | 11136680 A | * | 5/1999 |

*Primary Examiner* — Tuan C. To
(74) *Attorney, Agent, or Firm* — Michael Haynes PLC; Michael N. Haynes

(57) ABSTRACT

Certain exemplary embodiments of the present invention provide a method of guiding a traveler, comprising the activities of: obtaining a route from a first approach to a destination; selecting a sequential set of way points along said route, said sequential set of way points chosen to assist a traveler in following said route; capturing a visual image of each way point from said sequential set of way points to form a set of visual images; arranging said set of visual images into a static viewable sequential order; and in response to a user's selection of said first approach from a predetermined set of approaches to said destination, providing said set of visual images to said user.

28 Claims, 8 Drawing Sheets

(56) References Cited

U.S. PATENT DOCUMENTS

| | | | |
|---|---|---|---|
| 6,073,075 A * | 6/2000 | Kondou et al. | 701/203 |
| 6,078,865 A | 6/2000 | Koyanagi | |
| 6,115,669 A * | 9/2000 | Watanabe et al. | 701/428 |
| 6,144,318 A * | 11/2000 | Hayashi et al. | 340/995.19 |
| 6,151,081 A * | 11/2000 | Gold et al. | 348/756 |
| 6,184,823 B1 * | 2/2001 | Smith et al. | 342/357.31 |
| 6,199,014 B1 * | 3/2001 | Walker et al. | 701/211 |
| 6,202,026 B1 | 3/2001 | Nimura | |
| 6,243,030 B1 | 6/2001 | Levine | |
| 6,282,489 B1 * | 8/2001 | Bellesfield et al. | 701/533 |
| 6,333,702 B1 * | 12/2001 | Hiyokawa et al. | 340/995.21 |
| 6,336,111 B1 * | 1/2002 | Ashby et al. | 707/715 |
| 6,351,706 B1 | 2/2002 | Morimoto | |
| 6,351,710 B1 * | 2/2002 | Mays | 701/211 |
| 6,421,605 B1 * | 7/2002 | Steiner et al. | 701/209 |
| 6,434,482 B1 | 8/2002 | Oshida | |
| 6,477,462 B1 | 11/2002 | Rychlak | |
| 6,477,526 B2 * | 11/2002 | Hayashi et al. | 701/532 |
| 6,490,519 B1 * | 12/2002 | Lapidot et al. | 701/117 |
| 6,525,768 B2 | 2/2003 | Obradovich | |
| 6,587,787 B1 * | 7/2003 | Yokota | 701/532 |
| 6,611,753 B1 | 8/2003 | Millington | |
| 6,741,790 B1 | 5/2004 | Burgess | |
| 6,775,361 B1 | 8/2004 | Arai | |
| 6,889,137 B1 * | 5/2005 | Rychlak | 701/209 |
| 6,903,763 B1 | 6/2005 | Noguchi | |
| 6,983,203 B1 | 1/2006 | Wako | |
| 7,133,837 B1 | 11/2006 | Barnes | |
| 7,170,632 B1 * | 1/2007 | Kinjo | 358/1.9 |
| 2004/0239688 A1 | 12/2004 | Krajec | |

\* cited by examiner

METHODS AND SYSTEMS FOR VISUAL ADDRESSING

This application is a continuation-in-part of, and claims priority to, pending PCT Application PCT/US01/27735, filed 27 Sep. 2001, which is a continuation of U.S. Ser. No. 09/671,271, filed on 28 Sep. 2000, and issued on 26 Feb. 2002 as U.S. Pat. No. 6,351,710, titled "Method and System for Visual Addressing".

BRIEF DESCRIPTION OF THE DRAWINGS

The invention and its wide variety of potential embodiments will be readily understood via the following detailed description of certain exemplary embodiments, with reference to the accompanying drawings in which.

DETAILED DESCRIPTION

In certain exemplary embodiments of a baseline method for providing visual guidance to a traveler, motorist, or end user, a series of way point photographs can be compiled into a static pictograph such that the physical arrangement of the individual photographs can provide the desired guidance. The arrangement can provide way points in natural driving order for ease of use. The pictographs can be hard copies provided as a single sheet, a fold-up brochure, or in booklet form regenerated from downloaded digital data. The photographs can be produced by physically traversing the routes between predetermined starting points and desired destinations, capturing scenes of selected way points using any of a variety of scene-capturing devices, while verifying and/or proving the validity, viability, and/or practicality of the route. These photographs then can be annotated, processed, stored, and/or subsequently retrieved as needed for delivery to an end user. In an advanced regional method for providing guidance between a plurality of starting points and a plurality of destinations—all within the boundaries of the region—a large number of way point photographs can be taken and compiled into a "city booklet." Thereafter, responsive to specific end-user requests detailing one or more starting points and/or one or more destinations, routes can be provided, and/or selected by joining paths of way points based on their locations, to produce a pictograph and/or a route listing. In either the point-to-point or regional approach, the end user can be guided by visually correlating the photographs of actual way points with superimposed directional arrows and descriptive text with the road actually being traveled as seen through the traveler's windshield and/or eyes.

Figure 1:
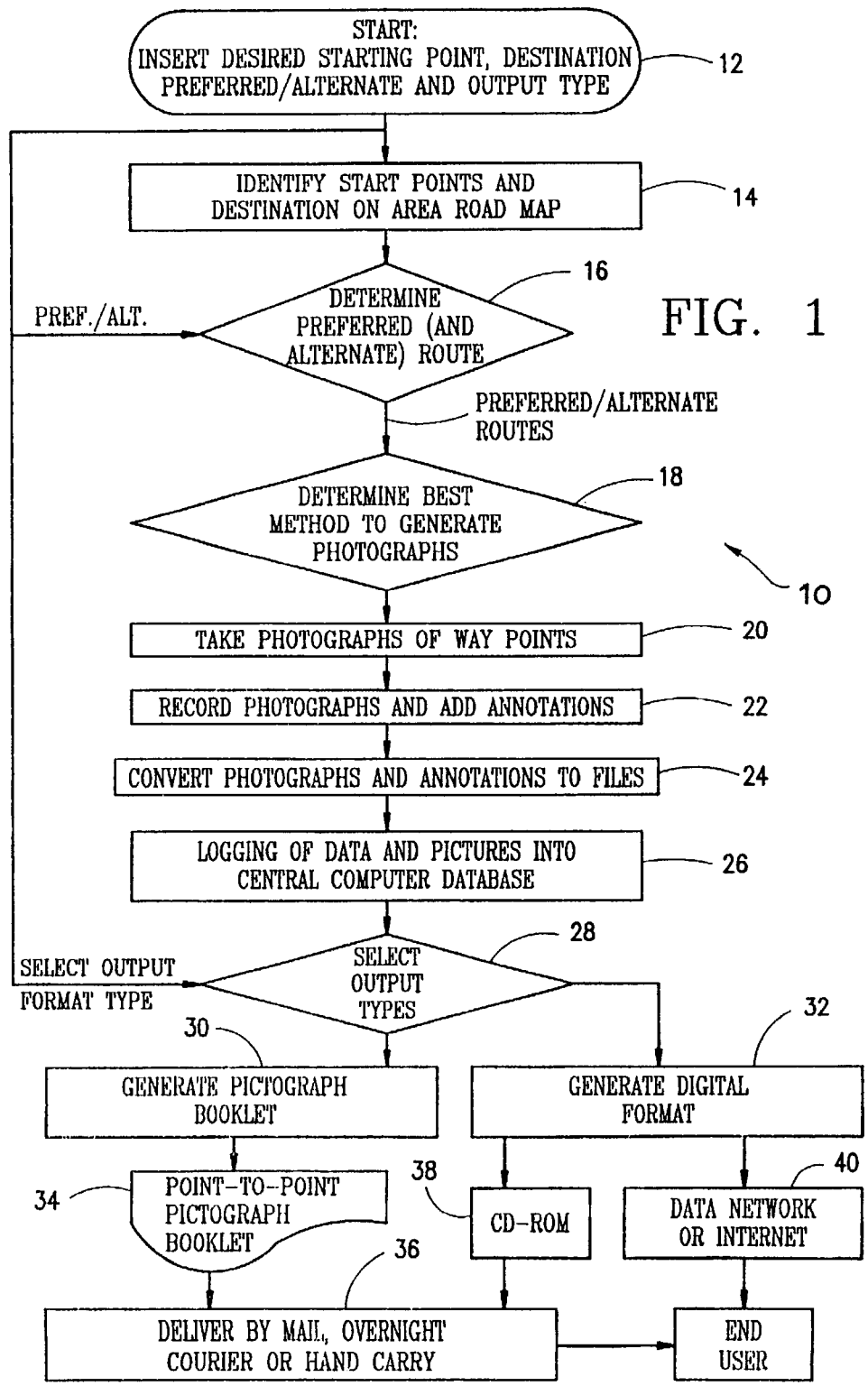
FIG. 1 is a flow chart detailing a baseline point-to-point embodiment of a visual addressing method according to the present invention.

Referring now to FIG. 1, there is shown a simplified flow chart outlining a baseline visual addressing method according to an exemplary embodiment of the present invention. The baseline method 10 details the steps to implement a point-to-point embodiment used for guiding an end user from a single predetermined starting point to a single desired destination point. As used herein, the phrase "starting point" can include a specific geographical location (e.g., 123 East Main Street, the White House, etc.), a general location (e.g., south of Charlottesville, inside the I-495 Capitol Beltway, etc.), an approach (e.g., from Harrisonburg, I-81 South, US 29 north of Charlottesville, the inner loop of the I-495 Capitol Beltway, etc.), and/or a direction of travel (e.g. southward, northeasterly, etc.). In certain embodiments, starting points can be determined by a route developer. An end user and/or traveler can select a starting point from a set of starting points predetermined by the route developer. Block 12 depicts the largely manual step of obtaining and entering the predetermined starting point, the desired destination, calling for a preferred or alternate route between them, and further designating the particular type of output desired (e.g., hard copy, downloadable file, screen display, etc.). In block 14 the inputs can be located on a road map of suitable scale, and a preferred or alternate route between the two can be determined in block 16 for eventual presentation to an end user and/or traveler. A preferred route typically can be determined by a priori knowledge of local road conditions, and other factors such as road construction, traffic flow, temporary hazards, and the like. Identification or selection of alternate routes can also be accomplished at block 16 for possible future use. Depending on the particular implementation employed, these method steps may be accomplished manually, via automated means, or more commonly using a combination of manual and automated means.

At block 18, the largely manual step of determining the best method for generating photographs of the way points can be accomplished. This can include selection of one or more photograph-capturing devices in accordance with the nature of the roads, traffic conditions, time of year, and the like. As used herein, way points may include starting points, destinations, main and/or secondary intersections, en route landmarks, turn locations and other end-user useful locations which call for a photograph. Standard photographic cameras, camcorders, digital cameras, plus variants of these and other devices are contemplated for use, with the 35 mm camera generally considered as the baseline photograph-capturing means. At block 20, the actual photograph-taking steps can be accomplished by physically traversing the preferred (and/or alternate) route(s) and capturing the images associated with the way point locations previously determined. On completion of the photographing, way point images can be recorded and/or annotated in block 22. These annotations may include a range of information types to be used for end-user purposes, for cataloging and for administrative requirements. Textual and/or graphic annotations can be added which will appear along with a particular photograph to provide standardized written directions and/or visual direction symbols to the end user. Cataloging annotations may include assigning way point physical location addressing, internal accession address codes, and/or date and time of capturing the photographs. Administrative annotations may include information on what type of image-capturing device produced the photograph as well as copyright notification, and the like. The results of this combining—images, directional information, text, addressing, etc.—can be converted in block 24 into one or more computer-readable files and/or stored for subsequent retrieval in a main computer database at block 26. The output of block 28 can be conditioned by a control input from block 12 to select the desired type of output format to be generated by blocks 30 and 32. Block 30 can generate a pictograph booklet 34 which may then be delivered to an end user by mail, overnight courier, or other type of physical delivery means 36. Block 32 can generate essentially the same content as in a pictograph, but in digital form, such as for producing a CD-ROM 38 for physical delivery, and/or for outputting and/or delivering to an end user via various networks 40, including the Internet, a virtual private network, a local area network, and/or a wide area network, etc.

Figure 2:
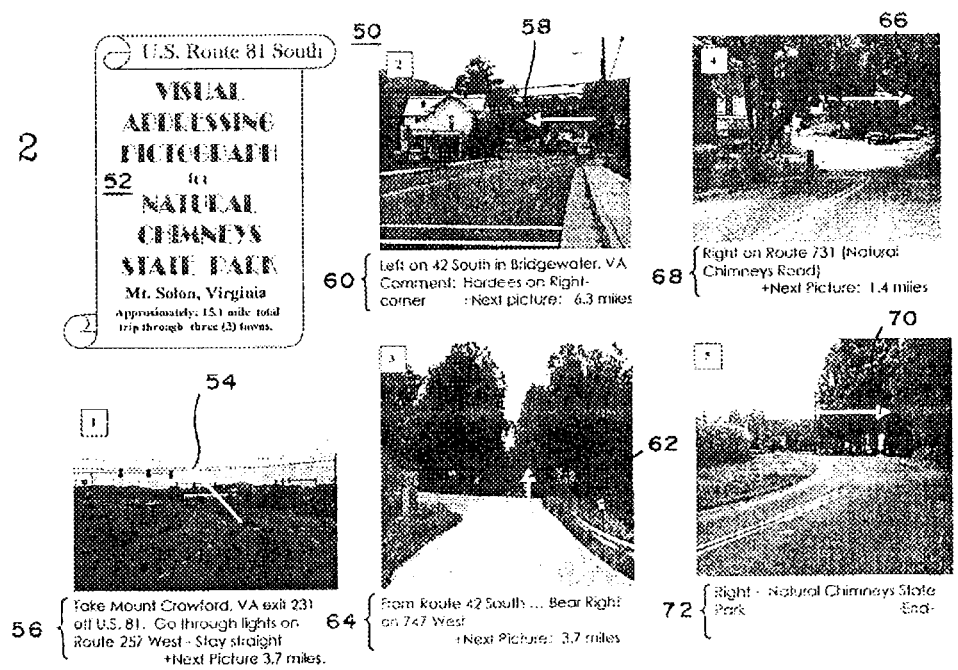
FIG. 2 is a pictograph produced via the method of FIG. 1 showing photographs of five way points directing an end user from a particular starting point to his/her desired destination.

A typical point-to-point pictograph is shown in FIG. 2 as five photographs arranged in a static sequence to guide an end user along a preferred route. A pictograph 50 can be provided as a hard copy sheet, brochure, folder and/or digital file for generating the equivalent thereof, providing visual addressing to, illustratively, the destination of National Chimneys State Park in Virginia, as indicated in a legend area 52, and includes annotated photographs numbered [1] through [5]. In photograph [1] we see the actual road scene that the driver/ end user would encounter upon exiting interstate highway US 81 south at exit 231, his/her starting point. A superimposed arrow 54 indicates the path to be taken along the road shown, and the annotations in area 56 provide additional textual detail and guidance for the driver. Thereafter, photographs [2], [3] and [4] provide photographs of three additional way points in proper driving sequence or order, including directional arrows 58, 62 and 66 along with their corresponding textual annotation areas 60, 64 and 68. In the final photograph [5], the entrance to the desired destination is seen with a right turn directional arrow 70 denoting the path to the entrance, as described in the annotation area 72. As taught herein, arranging the way point photographs in driving order means that the photographs are physically arrayed, or may be numbered so as to be arrayed, in the same order as a driver properly following the route would naturally encounter the way point locations that the photographs represent.

Thus there has been described the baseline point-to-point visual addressing method of the present invention, which can present en route travel information in a highly intuitive manner such that it can be immediately useable by a driver or end user without the need to learn or manipulate complex or confusing systems or devices. In a nutshell, a number of actual photographs can be produced and arranged in a natural or driving order sequence in hard copy form to guide a driver along a preferred route from a single predetermined starting point to a desired destination. Ideally, each way point photograph is taken and presented from a driver's eye view; at a designated distance and exposure so that the driver or end user can get familiar with the distance perception portrayed. Any pictograph, photograph, and/or any representation of a photograph can also be annotated, augmented, and/or associated with, for example, text (e.g., having standardized wordings), direction arrows, icons, dots, highlighting, and/or other symbols for focusing the traveler on a certain part and/or aspect of the route. For example, a red dot can appear "on" an interstate exit sign in a photo of an exit-sign-filled interchange to indicate the exit sign corresponding to the correct route. A digital version of the pictograph may also be produced and stored in a hard medium or outputted via a digital network for generating a hard copy form of the pictograph.

As used herein, the meaning of the term pictograph is accordingly expanded from its narrow dictionary definition to encompass a compilation of visual images in and/or producible in tangible form (i.e., hard copy), arranged in a particular sequence or manner so as to visually assist an end user in accomplishing a desired task. The images may include annotations such as graphics, text, and/or addressing. In terms of the present invention, the task is that of aiding in the driving of a vehicle from a starting point to a desired destination unerringly, without the driver or other occupant having previously traveled the route. Note that the point-to-point method is not necessarily limited to just short trips or highly-localized areas. It is contemplated that a dozen or two carefully selected way points may be adequate to guide a motorist from the western end of the George Washington Bridge in New York City, down the New Jersey Turnpike to a destination in Baltimore just off I-695, the Baltimore Beltway.

Figure 3:
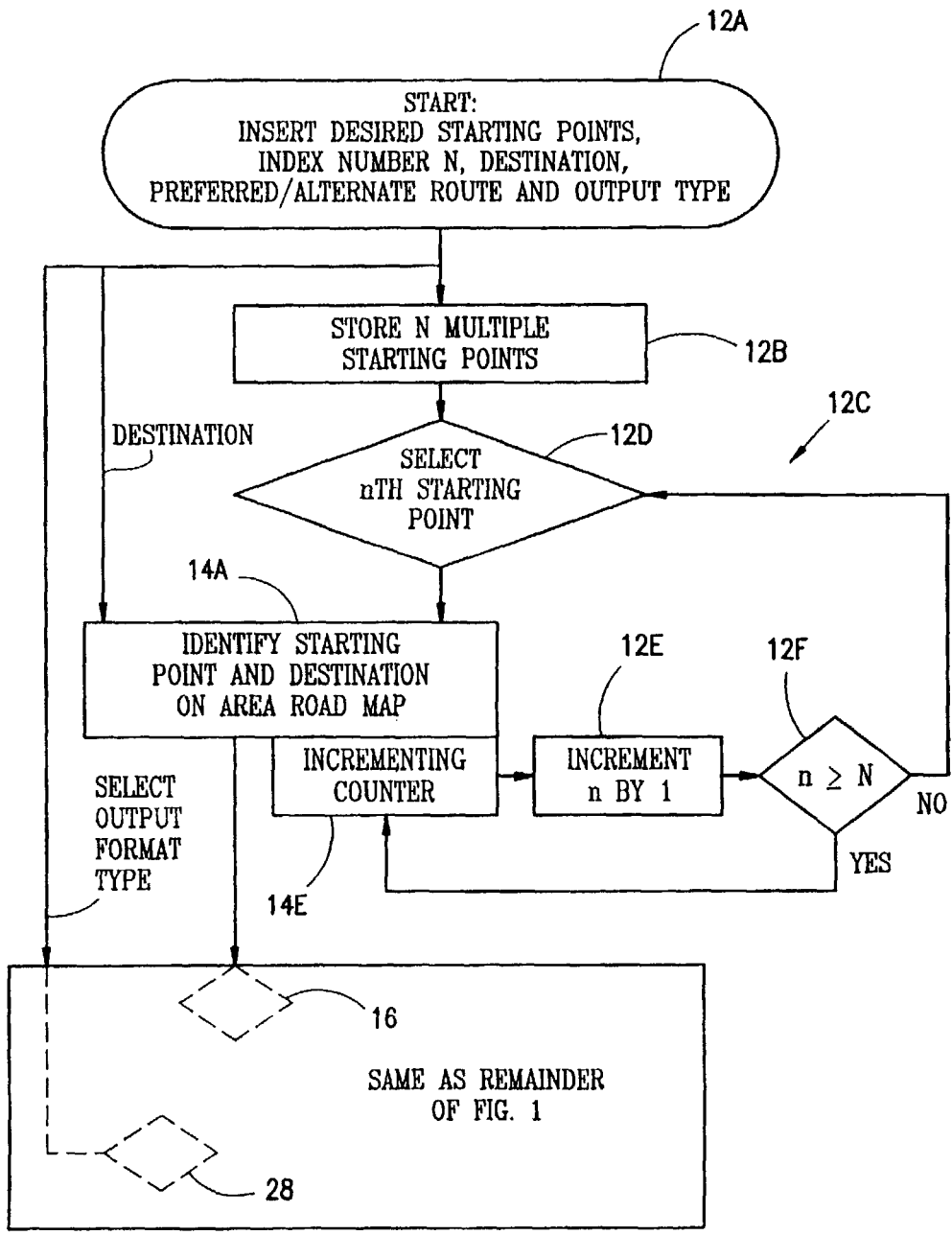
FIG. 3 is a partial flow chart showing an alternate embodiment of the point-to-point visual addressing method of FIG. 1 whereby a number of different starting points are accommodated.

The above baseline embodiment is readily amenable to being of even greater usefulness in expanded embodiments. Consider first the commonly encountered need to guide a traveler to a given destination where the traveler may be approaching from any one of several different directions, which gives rise to the need for a multiple starting point capability. FIG. 3 shows a modification to the method of FIG. 1 to accomplish this. Whereas the pictograph of FIG. 2 shows a single starting point, single destination brochure, it might be more generally useful to provide a plurality of pictographs, each of which is devoted to a different starting point. These may include approaching the single destination from the north, south, east or west, as well as approaching from more than one interstate highway, or from other well-known roadways or intersections.

In the partial flow chart of FIG. 3, block 12A includes the additional capability of accepting multiple starting points and an index number N denoting how many of them are inputted. The N starting points are stored in block 12B for sequential use under the control of a counting loop 12C. On retrieval of the first (n=1) of N starting points by selection block 12D, the method proceeds substantially as described in connection with the FIG. 1 embodiment to produce a pictograph in the desired output type for the particular starting point selected. On completion of processing the first starting point in block 14A and thereafter, block 14A then increments counter 14E by one count causing the blocks 12E and 12F to select the next (n=2) starting point to be fully processed to produce another distinct pictograph. When the full N starting points have been processed, block 12F cuts off the incrementing counter 14E and the system becomes quiescent waiting for a new set of data to be loaded at block 12A. The N distinct pictographs thus produced may be provided as stand-alone hard copies, or they may be combined into one or more booklets or brochures. The digital output type, if selected, is similarly handled. Note that the blocks functionally below the modification of FIG. 3, namely blocks 16 and 28 and thereafter, operate identically as previously described.

Figure 4:
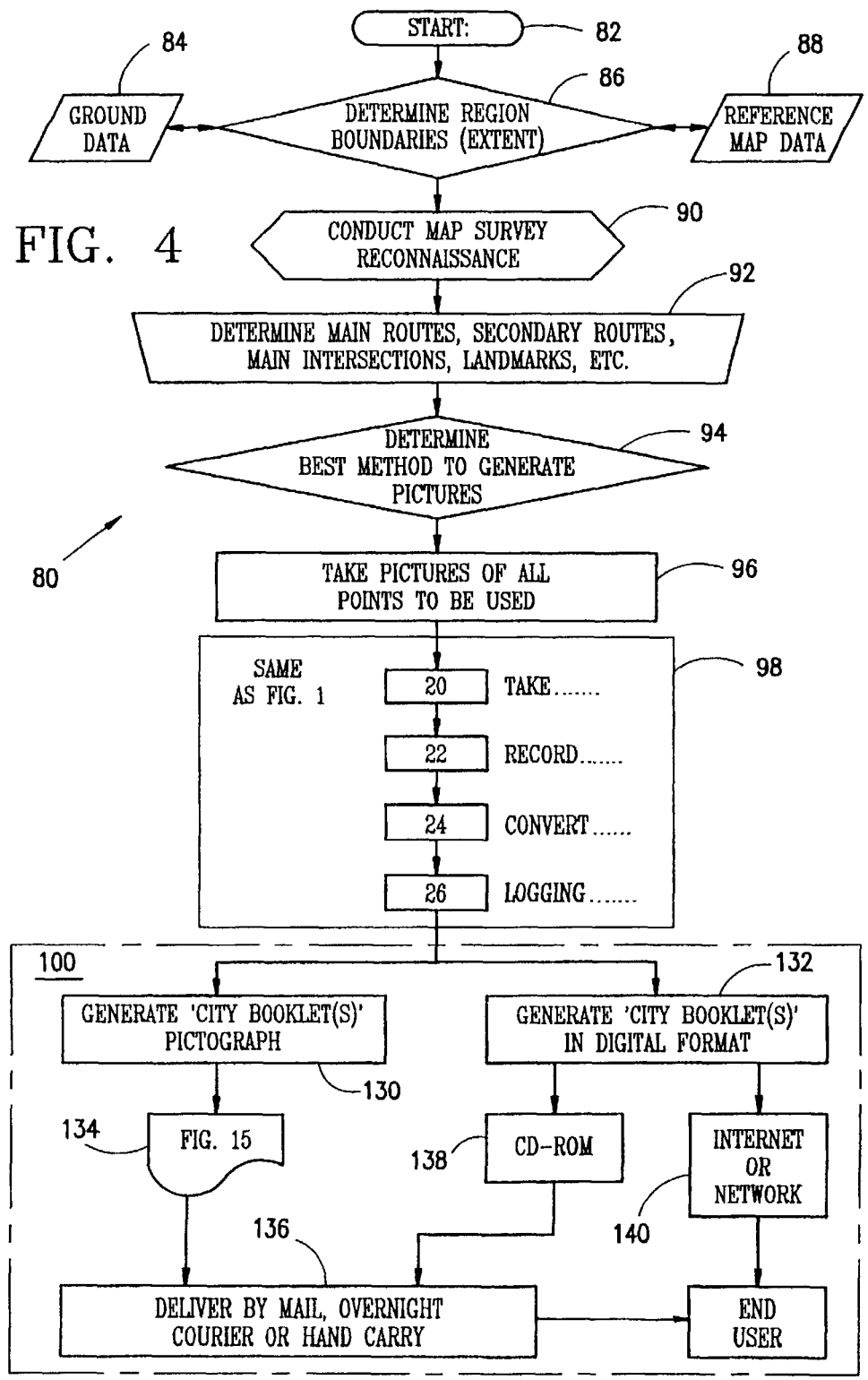
FIG. 4 is a flow chart detailing an advanced regional embodiment of a visual addressing method according to the present invention.

An advanced regional embodiment of a visual addressing method employing the techniques taught herein is detailed in the flow chart of FIG. 4. Whereas the previous point-to-point embodiments are concerned with guiding an end user from a particular one or more starting point(s) to a single destination, the regional visual addressing method allows for a much more generalized approach. Briefly, the regional method is carried out by compiling a large number of way points in a given region so as to facilitate guiding an end user from any one of many, or virtually any, starting point(s) within the region to any one of many, or virtually any, destination(s) within that region. The region may be as large as a major city, may encompass a college campus or hospital complex, or may be as small as a local shopping mall. All that is required is the inclusion of a sufficient number of way point photographs to permit the eventual assembly of a pictograph having enough detail to enable an end user to get from a selected starting point to a desired destination.

This regional embodiment is described first in terms of how to produce a collection of photographs to be assembled into a "city booklet" either in hard copy or in digital form as shown in FIG. 4, and second how an end user can use the city booklet. With concurrent reference now to FIGS. 4, 5, and 6 (and occasional brief reference to FIGS. 1-3), note that FIG. 4 describes a method 80 of implementing the regional embodiment, FIG. 5 as an illustrative city booklet 200 produced by the method of FIG. 4, and that FIG. 6 describes a method 250 of using the regional city booklet.

In blocks 82 and 86 of FIG. 4, the boundaries of the region to be covered are determined and entered. As before, many of the steps may be accomplished by manual means, by automated means, or more commonly, by using combinations of the two. The boundaries are confirmed using publicly available ground data of block 84 and reference map data of block 88. In blocks 90 and 92, the largely manual steps of conducting a map survey of the coverage region, determining the main roads and intersections, and so forth, are accomplished. Based on the results of the processes of blocks 90 and 92, a number of way points needed to define a number of routes through the city are identified. Thereafter, having this suitable number and locations of way points in hand at block 94, the best method of verifying the route and generating photographs at each way point is accomplished, as previously described. Blocks 94, 96, and 98 then process the photographs, as previously described. (Note that block 98 includes virtually the same steps as blocks 20, 22, 24, and 26 of FIG. 1.) An output section 100 functions identically to that of blocks 28 through 40 of FIG. 1, the primary difference being the control of the output pictograph or its digital equivalent and the providing of both hard copy pictographs via block 130 and its digital equivalent via block 132. Note the absence of a specific block which selects output type. The purpose of providing both output types is given herein below in the method of use portion of the description.

Figure 5:
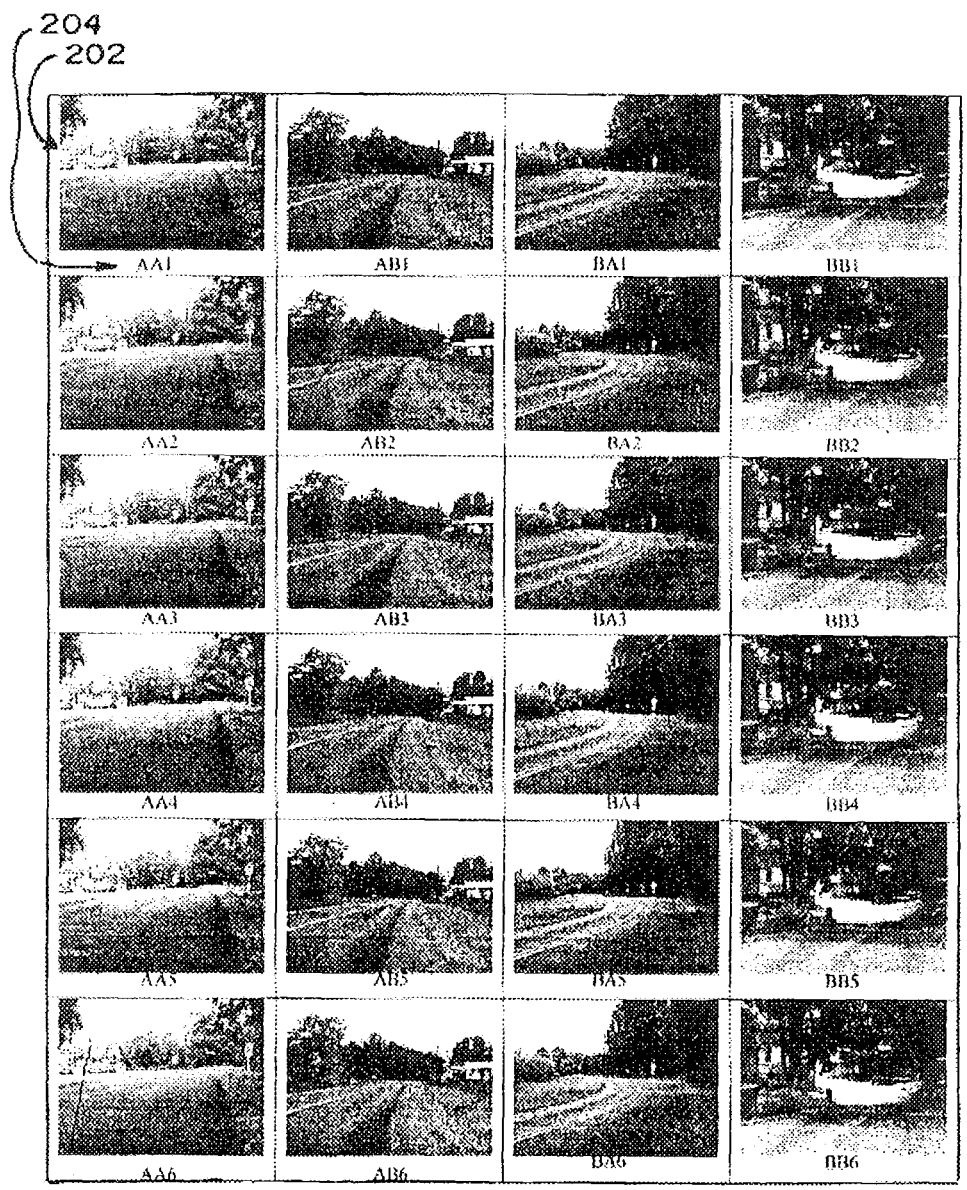
FIG. 5 is a "city booklet" pictograph produced via the method of FIG. 4, showing a large number of individual way point photographs assembled into an addressable array.

FIG. 5 shows a typical city booklet 200 as an array of 24 photographs arranged in addressable order. An illustrative photograph 202 shows a single way point which may be called up with reference to its internal address AA1, as shown in an address area 204. As used herein, "city booklet" describes a compilation of a plurality of photographs where the photographs are arranged in an addressable array (in hard copy or digital form) for subsequent use in creating a point-to-point pictograph or for use with a route listing. In many ways a city booklet is much the same as a pictograph, but it lacks the physical sequence or natural driving order needed to guide an end user, and it includes a number of inapplicable photographs for any one preferred route. Also, the term city booklet is used in a generic sense to denote regional visual addressing and may include an entire city, only a downtown district, or may be as circumscribed as a large shopping mall, a university or medical campus.

The city booklet 200 is shown, illustratively, as a single sheet containing 24 photographs. However, larger regions covered by certain exemplary embodiments of the present method and system may contain significantly more photographs displayed on a number of pages, which may be bound into a booklet, or may be left free standing. It is estimated that a relatively small city such as Leesburg, Va. might require as many as several hundred (200-700) photographs to provide reasonably fine-grained guidance to a first-time traveler to get to and from its key locations—such as it's county courthouse, municipal office buildings, shopping malls and outlets, equestrian center, and the like. All of these can be reached via Leesburg's two main access highways of Routes 7 and 15, as approached from any of the four compass points.

Figure 6:
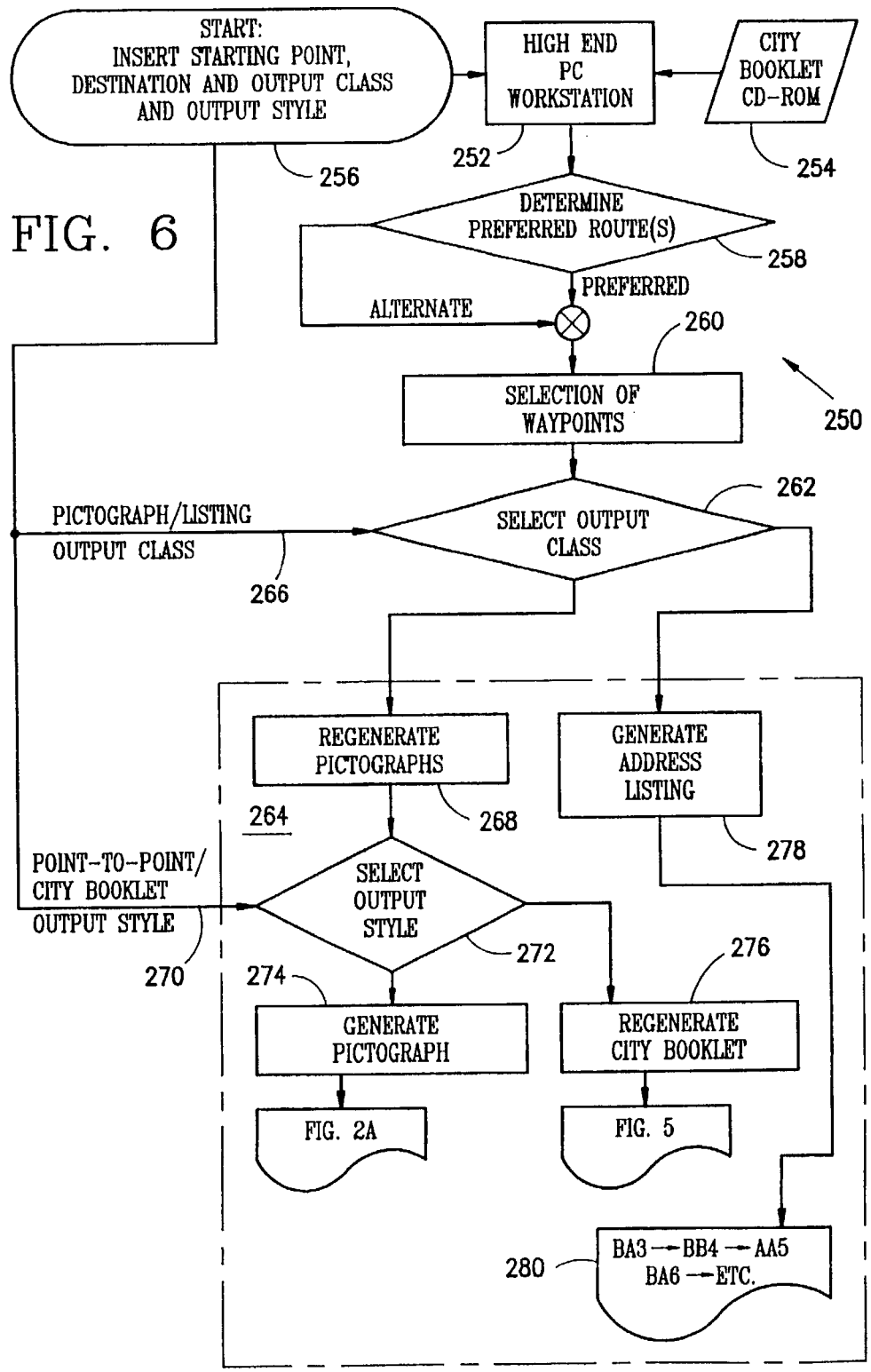
FIG. 6 is a flow chart outlining how to use the regional embodiment visual addressing method of FIG. 4 using the addressable array of photographs of FIG. 5 to generate various types of visual addressing outputs.

FIG. 6 is a flow chart detailing a preferred manner of using an addressable array of photographs such as those in the city booklet 200. A workstation-based method 250 has as its core a high-end PC 252 into which has been loaded a CD-ROM 254 containing an appropriate city booklet in digital form, such as that produced in block 138 of FIG. 4. With real time programming in operation in PC 252, an operator, (or possibly an end user) can insert a predetermined starting point and a desired destination, and/or can designate what combination of output classes and/or styles is desired via a block 256. Three possible outputs are: a point-to-point pictograph similar to that of FIG. 2; a regional city booklet as shown in FIG. 5; or a route listing yet to be described. In block 258 a preferred route (and possibly an alternate) can be determined by connecting a path derived by linking together a collection of way points based on their physical location addresses which were inserted during the annotation steps. Alternatively, a pre-determined route and/or its pictograph can be previously associated with a given starting point and destination, and/or stored for retrieval when the given starting point and/or destination are selected by a user. The actual selection of way points is accomplished in block 260. Because the way point photographs already exist as digital files storage 254 (e.g., CD-ROM, DVD, hard disk, server, database, Flash RAM, EPROM, tape, etc.), it is not necessary to generate them again but only to transfer them to hard copy output section 264 or its digital equivalent under the control of class selection block 262. In response to a designation of pictograph and/or listing signal via line 266 the user may first select a desired output class. If the pictograph output class is selected, the stored photographs regenerated in block 268 then can be transferred to produce either a point-to-point pictograph as determined by the inserted starting point and destination, similar to that of FIG. 2—or alternately to regenerate a hard copy of the city booklet of FIG. 5. Which of output styles is produced can be determined by the designation input via line 270 which can route the regenerated photographs via block 272 to blocks 274 and 276 which can generate one of the output styles, shown as FIG. 2 or FIG. 5.

If the listing output class is selected, block 278 generates a listing of way point addresses produced in block 260 such that the sequence of the way points constitutes the preferred route in proper driving order. This output listing can be downloaded, rendered, and/or printed out as sheet 280 and may then be used in combination with a preexisting copy of a corresponding city booklet, or with a newly-regenerated copy of the city booklet via blocks 272 and 276. Thereafter, an end user armed with one of two styles of pictographs and/or an address listing can, as before, be unerringly guided to his/her desired destination.

Figure 7:
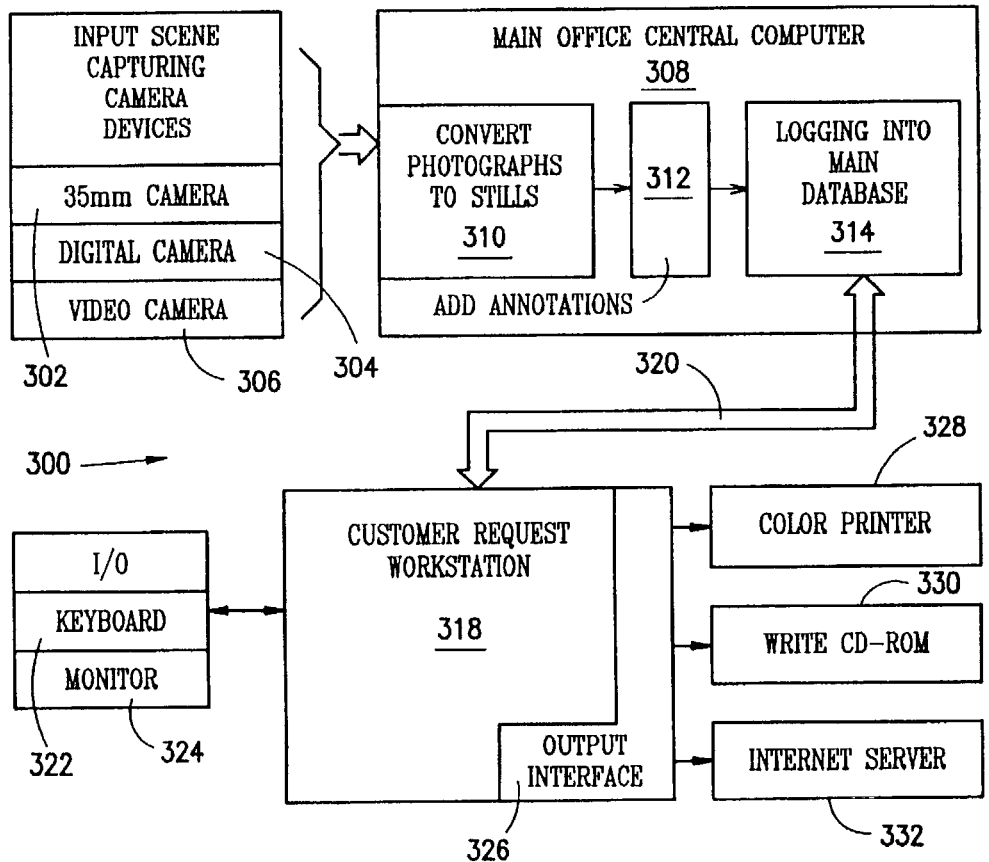
FIG. 7 is a simplified block diagram showing an apparatus by which the point-to-point methods of FIGS. 1-3 may be implemented.

Referring now to FIG. 7, illustrative apparatus via which the point-to-point embodiments of FIGS. 1-3 may be implemented is shown in simplified block diagram form. A point-to-point system 300 can include one or more input scene-capturing devices, including a 35 mm camera 302, a digital camera 304 and a video camera 306. As previously detailed, the actual type of input device employed can be determined by actual scene-capturing conditions encountered—traffic, weather, time of day, etc. along the route or at the way point being considered. The 35 mm camera is considered as the baseline input device, and photographs can generally be taken by a windshield-mounted camera using 100, 200 or 400 speed film. As the rolls of film are exposed, they can be processed at, for example, a home office facility, to verify quality, way point location, database entry, and/or logging, then uploaded into, for example, a central computer, in any picture and/or graphics file format, such as JPEG, GIF, PDF, etc.

Digital camera 304, capable of using an internal memory or a disk (internal or external) and capable of being equipped with zoom/special light receiving capabilities, may also be used. In congested travel areas where additional vehicle safety is required, video camera 306 can be indicated for use. Still frame pictures can be made at predetermined road sites, landmarks, and the like while traveling. Snappy software can provide the desired conversion to compatible output types.

The bulk of the photograph processing, annotation, conversion, etc. can be accomplished on a central computer 308. In the block 310 the 35 mm photographs are converted into JPEG files, digital camera photographs are uploaded, and/or transposed video tapes are edited and/or converted to still-frame photographs. In block 312, photograph annotations and other control inputs can be added via a keyboard 322, and all data and photographs can be assembled into a main database 314, which can reside on a web server. In a preferred basic embodiment, the database 314 may be implemented using a minimum Microsoft Windows operating system running on a computer comprising an Intel 486, Pentium, or Pentium Pro or higher processor; 16 MB of RAM; 8-bit (256-color) or greater display adapter; and a 2×CR-ROM drive or faster). Alternatively, the database 314 can be implemented using any of the following operating systems: Windows 3.1x with DOS 5.0 or later, Windows 95 or Windows NT. (version 3.5.1 or greater).

Production of pictographs can be accomplished using a personal computer customer request workstation 318 which can communicate with the main database 314 via a bidirectional bus 320 and/or network, such as the Internet, a local area network, a wide area network, a virtual private network, a wireless network, etc. The workstation 318 can include I/O devices such as a keyboard 322, monitor or display 324, speaker, microphone, and/or an output interface 326. Responsive to specialized programming running in the workstation 318, and/or operator commands entered via keyboard 322, any of three output means may be enabled. A printer 328 can generate the pictograph sheet, booklet, and/or brochure (per 138 of FIG. 4) when called for. A local storage device, such as a hard disk, RAM, flash RAM, EPROM, tape drive, DVD-RAM, and/or CD-RW drive 330 can store the digital equivalent of a pictograph (per 38 of FIG. 1) or a city booklet (per 138 of FIG. 4) as required. A network and/or network-connected server, such as an internet server 332, e.g., a file server and/or web page server, can provide the various outputs in digital form (per 140 of FIG. 4 and/or per 40 of FIG. 1).

Figure 8:
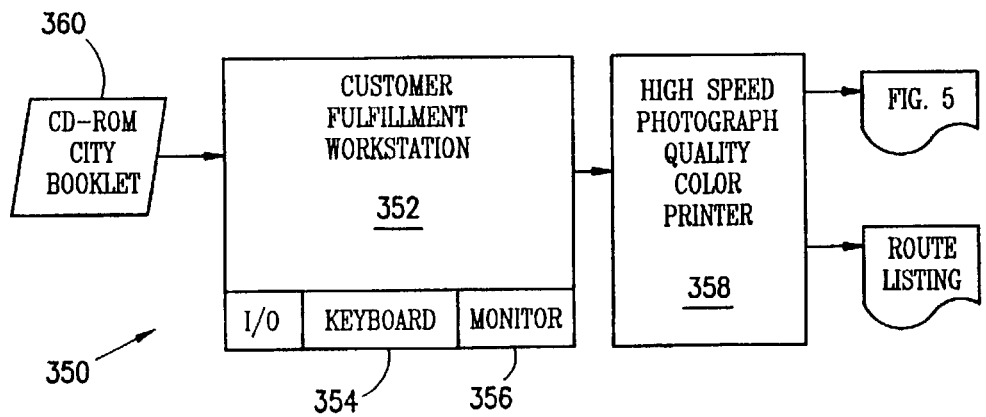
FIG. 8 is a simplified block diagram showing an apparatus by which the regional method of FIGS. 4-6 may be implemented.

FIG. 8 shows an illustrative apparatus, in simplified block diagram form, via which the regional embodiment described in FIG. 6 may be used. A regional use system 350 can be based on the capabilities of an information device 252, such as a personal computer, laptop, and/or Personal Digital Assistant (PDA), graphical display empowered cell phone, etc., serving as the core of a customer fulfillment workstation. The fulfillment workstation 352 can include I/O devices such as a keyboard 354 or other input device (e.g., microphone with voice recognition software, touch screen, trackpad, scroll wheel, navigation buttons, retinal tracker, etc.), a speaker, a monitor or display 356, and/or a printer, such as a laser printer, an ink jet printer, and/or a photographic quality color printer 358. Upon loading a CD-ROM 360 containing a regional city booklet, such as item 138 of FIG. 4, and/or downloading such a booklet, and/or accessing a web site containing such a booklet, and entering one or more starting points, destinations, and/or output classes and/or styles as requested by a customer or end user, the fulfillment workstation 352 can produce the desired outputs. The operating system resident in the workstation 352 can function as previously described in connection with output block 100 of FIG. 4, with the exception that workstation 352 does not necessarily need to replicate the Internet or network outputting capability. Thus, the customer fulfillment workstation 352 can render (i.e., make perceptible) and/or generate a hard copy of a pictograph, city booklet, and/or route listing (per 276 of FIG. 6) for guiding an end user from the inputted starting point(s) to the inputted destination(s).

Figure 9:
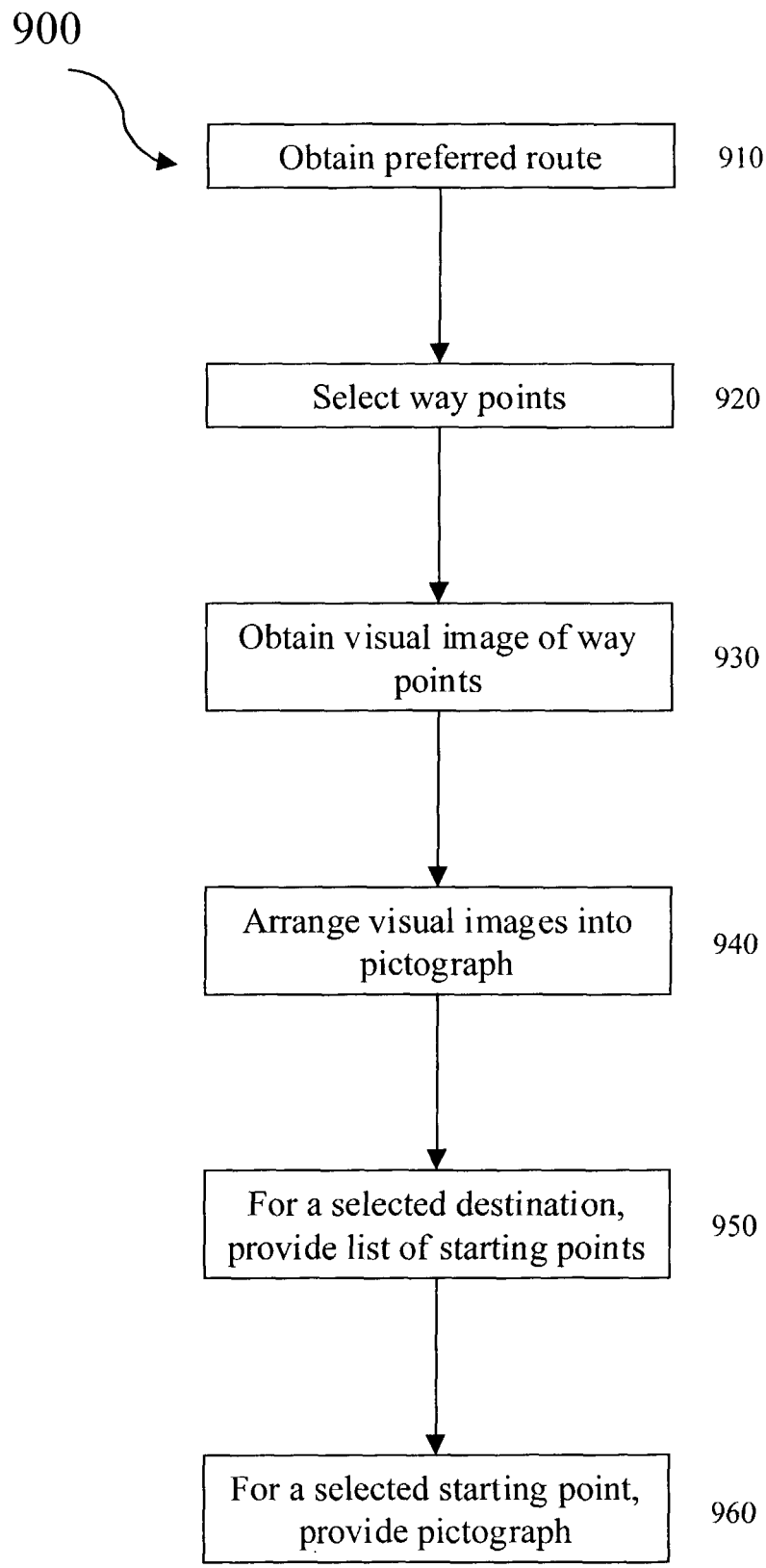
FIG. 9 is a flow diagram of an exemplary embodiment of a method 900 of the present invention.

FIG. 9 is a flow diagram of an exemplary alternative embodiment of a method 900 of the present invention. At activity 910, a preferred route is obtained, the route extending from a first starting point, such as a first approach, to a first destination. At activity 920, before, during, or after physically verifying the route, a sequential set of way points along the route is selected. At activity 930, a visual image of each of the selected way points is obtained, as described supra. At activity 940, the set of visual images of the selected way points is arranged in a static viewable sequential order, such as a sequentially-ordered pictograph and/or city booklet, sequence matching what a traveler following the route would perceive. At activity 950, in response to a user's selection of the first destination, a set of predetermined starting points can be rendered to the user. At activity 960, in response to a user's selection of a first predetermined starting point from the set of predetermined starting points, the set of visual images can be provided to the user, such as via a downloaded digital file, a rendered digital file, a displayed web page, and/or a hard copy, etc., and formatted as a pictograph, city booklet, and/or route listing, etc. If provided digitally, the user can generate a hard copy of the set of visual images as desired.

In certain exemplary embodiments, any visual image and/or the set of visual images can be annotated, associated, and/or augmented with one or more textual descriptions associated with at least a portion of the route (e.g. a highway of the route, a way point along the route, etc.), the textual descriptions comprising driving instructions, mileage measurements, suggestions for sites of interest (e.g., tourist attractions, overlooks, rest areas, shopping, restaurants, etc.), driver warnings, etc. Such textual descriptions can be provided to a traveler and/or user at the option of the service provider and/or the traveler and/or user. If provided to the traveler and/or user, such textual descriptions can be stored, output, rendered, and/or printed at the discretion and/or selection of the traveler and/or user.

In certain exemplary embodiments, any visual image and/or the set of visual images can comprise, and/or can be annotated, associated, augmented, and/or replaced with, one or more video descriptions associated with at least a portion of the route, each video description comprising one or more video images, recordings, and/or clips, which can be created in much the same way as the photographic visual images, except with the aid of an analog and/or digital video recording device (e.g., analog camcorder, digital camera with video capability, digital camcorder, etc.). Such video descriptions can be provided to a traveler and/or user at the option of the service provider and/or the traveler and/or user. If provided to the traveler and/or user, such video descriptions can be stored, output, rendered, played, and/or printed at the discretion and/or selection of the traveler and/or user. The content and/or playback (e.g., starting point, ending point, displayed frames, progression, speed, refresh rate, fidelity, etc.) of such a video description can be predetermined, associated with a current location. route, way point, and/or travel speed, and/or controlled by a person viewing the video description.

In certain exemplary embodiments, any visual image and/or the set of visual images can be annotated, associated, augmented, and/or replaced with one or more audio descriptions associated with at least a portion of the route, each audio description comprising one or more audio recordings, clips, and/or samples, which can be created in much the same way as the photographic visual images, except with the aid of an analog and/or digital audio recording device (e.g., tape recorder, digital audio recorder, digital camera with analog annotation and/or recording capability, analog or digital camcorder, etc.). Such audio descriptions can be provided to a traveler and/or user at the option of the service provider and/or the traveler and/or user. If provided to the traveler and/or user, such audio descriptions can be stored, output, rendered, and/or played at the discretion and/or selection of the traveler and/or user. The content and/or playback (e.g., starting point, ending point, rendered clips, progression, speed, volume, fidelity, etc.) of such an audio description can be predetermined, associated with a current location. route, way point, and/or travel speed, and/or controlled by a person listening to the audio description.

In certain exemplary embodiments, any visual image and/or the set of visual images can be annotated, associated, augmented, and/or replaced with one or more computer-generated objects associated with at least a portion of the route, each object comprising one or more graphics, images, controls, and/or animations, etc. Such computer-generated objects can be provided to a traveler and/or user at the option of the service provider and/or the traveler and/or user. If provided to the traveler and/or user, such computer-generated objects can be stored, output, rendered, printed, and/or played at the discretion and/or selection of the traveler and/or user.

In certain exemplary embodiments, a pictograph, city booklet, and/or route listing can include one or more promotional items, such as an advertisement, coupon, business card, notice, announcement, press release, etc., at any location in the pictograph, city booklet, and/or route listing. A promotional item can be provided depending on the starting point, destination, route, way points, etc. The promotional item can be modified dynamically, so that, for example, any hard copy output, screen displays, and/or digital files provided after the modification to the promotional item can contain the modified promotional item.

Moreover, the promotion item can provide a link to, for example, a second pictograph showing a route to a location of the promoter and back to the original pictograph, route, etc. As a further example, if a first pictograph leads a traveler on a route from an airport to a hotel, a promotional item included and/or associated with the first pictograph, including possibly an icon, can link the traveler to a second pictograph that leads the traveler to a restaurant and then back to the route of the first pictograph, or even directly to the hotel from the restaurant.

In certain exemplary embodiments, a pictograph, city booklet, and/or route listing can be requested and/or provided from a kiosk. Thus, a traveler at an airport, car rental counter, bus station, subway station, port, mall, business, street corner, etc. who does not currently personally possess a network-connectable and/or network-connected information device (e.g., a personal computer, personal digital assistant, web-enabled cell phone, etc.) and/or a printer can still obtain a pictograph, city booklet, and/or route listing.

In certain exemplary embodiments, a pictograph, city booklet, and/or route listing can augment and/or enhance an existing navigation system, such as, for example, OnStar, Mapquest, etc., and/or can be used to verify a route provided by such an existing navigation system.

In certain exemplary embodiments, a pictograph, city booklet, and/or route listing can be provided via alternative information devices, such as wrist watch display, a television, a portable DVD player, a hologram projector, an automobile visor display, a windshield projection system, a portable navigation device, etc. For example, a pictograph, city booklet, and/or route listing can be holographically, photographically, and/or videographically projected such that it appears to be displayed approximately on (i.e., on, near, slightly behind, and/or slightly in front of) at least a portion of an automobile windshield, in front of the traveler, in the actual direction, and/or in the direction of the route.

In certain exemplary embodiments, a pictograph, city booklet, and/or route listing can be provided in a format that is designed for use with a particular type of information device. For example, a user can request a pictograph that is formatted for use with a Treo 300 handheld communicator, available from Handspring Inc. of Mountain View, Calif. At a minimum, such a pictograph can be compatible with the operating system of the information device. Moreover, such a pictograph can include visual images that have sufficient, but not excessive resolution for the selected information device, are color-adjusted to optimize the display capabilities of the information device, fit on the screen of the information device without the need for scrolling, conserve power of the information device, and/or transfer rapidly to the information device, etc.

Although the invention has been described with reference to specific embodiments thereof, it will be understood that numerous variations, modifications and additional embodiments are possible, and accordingly, all such variations, modifications, and embodiments are to be regarded as being within the spirit and scope of the invention. Accordingly, the drawings and descriptions are to be regarded as illustrative in nature, and not as restrictive.

What is claimed is:

1. A method of guiding a traveler, comprising the activities of:

from a predetermined network-connected server computer, in response to a traveler's selection of a first destination and a selection by said traveler of a first starting point from a predetermined set of predetermined starting points rendered to said traveler, automatically providing to said traveler predetermined information, said predetermined information comprising:

a predetermined route;

an advertisement; and a predetermined sequential set of visual images arranged in a sequential order, a practicality of said predetermined route verified by a human who physically traversed said predetermined route according to said sequential order, said predetermined information provided to said traveler based on said verified practicality, each visual image from said set of visual images representing a photograph of a unique predetermined way point along said route, each of said predetermined way points lacking said advertisement, said predetermined route comprising, serially, said first starting point, said set of unique way points per said sequential order of said visual images, and said first destination.

2. The method of claim 1, further comprising proving said route.

3. The method of claim 1, further comprising providing said traveler a selectable plurality of destinations.

4. The method of claim 1, further comprising receiving said traveler's selection of said first destination.

5. The method of claim 1, further comprising, in response to said traveler's selection of said first destination from a predetermined set of destinations, providing said traveler said predetermined set of predetermined starting points.

6. The method of claim 1, further comprising providing said traveler said predetermined set of predetermined starting points.

7. The method of claim 1, further comprising receiving said traveler's selection of said first starting point.

8. The method of claim 1, wherein said first starting point comprises a location.

9. The method of claim 1, wherein said first starting point comprises an approach.

10. The method of claim 1, wherein said first starting point comprises a highway.

11. The method of claim 1, wherein said first starting point comprises a direction of travel.

12. The method of claim 1, wherein said first starting point comprises an approach and a direction of travel.

13. The method of claim 1, wherein said predetermined sequential set of visual images is provided to said traveler in a digital format.

14. The method of claim 1, wherein said predetermined sequential set of visual images is provided to said traveler in a printable format.

15. The method of claim 1, wherein said predetermined sequential set of visual images is provided to said traveler via a network.

16. The method of claim 1, wherein said predetermined sequential set of visual images is provided to said traveler via Internet.

17. The method of claim 1, further comprising providing to said traveler a textual description associated with at least a portion of said route.

18. The method of claim 1, further comprising providing to said traveler a video description associated with at least a portion of said route.

19. The method of claim 1, further comprising providing to said traveler a video description associated with at least a portion of said route, a playback of said video description controllable by said traveler.

20. The method of claim 1, further comprising providing to said traveler an audio description associated with at least a portion of said route.

21. The method of claim 1, further comprising providing to said traveler an audio description associated with at least a portion of said route, a playback of said audio description controllable by said traveler.

22. The method of claim 1, further comprising providing to said traveler a computer-generated object associated with at least a portion of said route.

23. The method of claim 1, wherein said predetermined sequential set of visual images is presentable holographically.

24. The method of claim 1, wherein said predetermined sequential set of visual images is presentable in front of the traveler.

25. The method of claim 1, further comprising providing a promotional item associated with at least one visual image from said predetermined sequential set of visual images.

26. The method of claim 1, further comprising providing a promotional item associated with at least one route corresponding to said predetermined sequential set of visual images.

27. The method of claim 1, further comprising providing a promotional item associated with at least one destination corresponding to said predetermined sequential set of visual images.

28. The method of claim 1, further comprising providing a promotional item associated with one of said unique predetermined way points along said route.

* * * * *